United States Patent [19]
Kenning et al.

[11] Patent Number: 5,600,730
[45] Date of Patent: Feb. 4, 1997

[54] SWIMMING TRAINING DEVICE

[76] Inventors: Peggy J. Kenning; John G. Kenning, both of 4907 Riverside Dr., Coral Springs, Fla. 33067

[21] Appl. No.: 288,319

[22] Filed: Aug. 10, 1994

Related U.S. Application Data

[63] Continuation-in-part of Ser. No. 182,796, Jan. 14, 1994, which is a continuation-in-part of Ser. No. 976,527, Nov. 16, 1992, abandoned.

[51] Int. Cl.⁶ .............................. H04B 3/00; H04B 1/034
[52] U.S. Cl. .............................. 381/77; 381/24; 381/187; 455/100; 455/351; 455/66
[58] Field of Search ................................ 381/77, 24, 187, 381/188; 455/205, 344, 66, 89, 90, 100, 351; 2/68, 209.13

[56] References Cited

U.S. PATENT DOCUMENTS

| | | | |
|---|---|---|---|
| 3,757,220 | 9/1973 | Abel | 325/47 |
| 4,321,433 | 3/1982 | King | 455/351 |
| 4,673,893 | 6/1987 | Shorkey | 331/64 |
| 5,251,326 | 10/1993 | Silverman | 455/90 |
| 5,349,702 | 9/1994 | Runckel | 2/68 |

*Primary Examiner*—Forester W. Isen
*Assistant Examiner*—Xu Mei
*Attorney, Agent, or Firm*—Weintraub DuRoss & Brady

[57] ABSTRACT

A swimming training device may be part of an overall training system. The device is deployable releasably in a swimming cap and can receive electromagnetic wave signals. The device can then convert the signals into electrical charges which are then translated into audible sound. The system includes the cap with the receiving device and a transmitting source. The transmitting source allows the broadcasting of verbal instructions, as well as music and timing signals.

6 Claims, 8 Drawing Sheets

SWIMMING TRAINING DEVICE

CROSS-REFERENCE TO RELATED APPLICATIONS

This application is a continuation-in-part of co-pending U.S. patent application Ser. No. 08/182,796, filed Jan. 14, 1994, which is a continuation-in-part of U.S. patent application Ser. No. 07/976,527, filed Nov. 16, 1992, now abandoned, both of the above-identified applications being incorporated herein by reference.

BACKGROUND OF THE INVENTION

1. Field of the Invention

The present invention relates to a swimming training device. More particularly, the present invention relates to a electromagnetic wave receiving device which is removably deployable in a swimming cap. Even more particularly, the present invention may comprise a swimming training system having a cap with such an electromagnetic wave receiver therein in conjunction with a transmission means.

2. Prior Art

Heretofore, swimmers in competitive training have suffered from a handicap not encountered by their counterpart land athletes. The handicap is the lack of interactive contact between a coach and an athlete during training. While training, the coach must yell instructions to the swimmer, with no surety that the athlete will hear the instructions. The situation leads to much frustration, strained vocal chords and poor training.

An additional problem incurred by swimmers in training is boredom. To build stamina, swimmers must spend many hours swimming multiple laps. Without a changing scenery or other stimulus, the swimmer only concentrates on the training and the exertion occurring. To alleviate this situation, some type of audio entertainment is desired.

One attempt to provide audible entertainment to a swimmer is described in U.S. Pat. No. 4,682,363, issued Jul. 21, 1987 to Goldfarb et alia and entitled "AMPHIBIOUS AUDIO SYSTEM". Goldfarb teaches an apparatus to provide radio or taped broadcasts to recreational swimmers, the apparatus comprising a band which encircles the head of a swimmer. The apparatus further comprises means for receiving public radio signals and means for converting the signals to audible sounds. Speakers sealed within ear plugs are coupled to the converting means, thereby transmitting the public radio broadcast to the swimmer. A first container mounted to one side of the band contains a cassette tape player. A second container mounted on the opposite side of the band contains batteries therein to supply power to the system. Tuning means to select an AM/FM broadcast is also disposed along the side of the band. The band is secured on the head of the swimmer by a Velcro fastener.

Goldfarb has drawbacks if used by a competitive swimmer. Goldfarb, as noted, is intended for use by recreational swimmers. This is reflected by the Velcro fastener on the band, which could easily come undone by the swift and vigorous motions of a competitive swimmer. This would be particularly evident when a swimmer performs a flip-kick to change directions. The Goldfarb apparatus would likely come undone, and thus inhibit practice. In this circumstance, Goldfarb could not accomplish its intended purpose.

Secondly, the Goldfarb device is not properly weight-balanced on the head of the swimmer. By placing the battery and cassette compartments on the sides of the headband, pressure is brought on the head to rotate. Additionally, the compartments would cause drag within the water. This would reduce the speed of the swimmer.

Finally, and most importantly, the Goldfarb device only receives radio broadcasts or plays pre-recorded tapes. This does not afford interactive communication with a coach. Rather, Goldfarb precludes this by piping a radio broadcast into the ears of the swimmer, particularly by the deployment of the speakers in ear plugs. Thus, the Goldfarb device could not be used by a swimmer during a practice where instruction is given or where distance training is desired.

A device to address the training of swimmers can be found in U.S. Pat. No. 4,885,797, issued Dec. 5, 1989 to Leather et alia and is entitled "COMMUNICATION SYSTEM". Leather et alia teach a communication system whereby an audio signal is transmitted by a coach to swimmers in a pool. The message is received only by selected swimmers, as sub-audible tones are selected and transmitted with the message. Thus, a receiver will only convert the received electromagnetic waves. Thus, a form of individualized training can be achieved with this device.

Leather, however has drawbacks. Firstly, the device of Leather must be sealed within the cap. It cannot be removed for repairs or other modifications. This is stated clearly in the reference, and is substantiated by the disclosed recharging system. Secondly, Leather allows only one message to be broadcast. Leather is limited to one broadcast frequency; thus, no additional broadcasts, such as music or tinting signals, can be given. Also, the swimmer has no control over the broadcast received. The instructor has total control over the messages given to the swimmer.

An additional problem with the device of Leather et alia is the fixed nature of the cap. As noted, the receiving device of Leather is of a fixed size. Thus, caps must be fitted to each swimmer, without means of adjusting for slight misalignment. Alternately, if a swimmer has a different sized head, the cap of Leather et alia cannot be altered for affecting proper usage by the second swimmer. Thus, a second sized cap of Leather et alia must be obtained.

What is needed in the art is a cap capable of receiving multiple broadcast frequencies from a single transmitting source. Further, there is need in the art for a cap in which the receiving device is easily accessible for replacement and/or regular maintenance. Additionally, a receiving device of an adjustable deployment would make caps utilizable over a range of wearer head sizes. Finally, a receiving device that could work up to distances of 450 feet and 30 feet of depth could accommodate not only competitive swimmers, but also afford use by those doing diving.

It is to these particular needs that the present invention is directed.

SUMMARY OF THE INVENTION

The present invention is a swimming training device capable of receiving electromagnetic wave signals from a transmission source. The training device of the present invention comprises:

(a) a housing having an lower base portion and an upper domed portion, the upper portion being sealingly mounted onto the lower portion;

(b) an antenna deployed within the housing to receive the electromagnetic waves;

(c) a receiver deployed within the housing and in connection with the antenna, the receiver converting the waves into an electrical signal;

(d) at least one speaker deployed within the housing, the speaker in connection with the receiver and converting the electrical signal into audible sound;

(e) means for conveying the audible sound from the unit to the ears of a listener. Alternately, the present invention may comprise a swimming training system, the swimming training system comprising:

(a) means for transmitting electromagnetic waves, the means for transmitting broadcasting signals over a plurality of frequencies, the means for transmitting comprising:

(1) a transmitter;

(2) a microphone in connection with the transmitter for broadcasting instructions;

(3) a metronome in connection with the transmitter such that a timing signal is broadcast;

(b) a receiving unit capable of receiving the electromagnetic waves, the unit comprising:

(1) an antenna to receive the waves;

(2) a receiver in connection with the antenna, the receiver converting the electromagnetic waves into electrical signals;

(3) at least one speaker in electrical connection with the receiver, the at least one speaker converting the signals into audible sound;

(4) a housing containing the antenna, receiver and at least one speaker therein;

(c) at least one arm connected to the housing;

(d) at least one ear plug connected to each arm, the arms and ear plugs serving as a conduit for the sound to pass from the receiving unit to the ears of a user; and (e) a swimming cap having a sleeve formed therein, the sleeve releasably retaining the receiving unit therein.

The present invention will be better understood by reference to the following detailed description, in conjunction with the accompanying drawings, wherein Like reference numerals refer to like elements, and wherein:

DETAILED DESCRIPTION OF THE PREFERRED EMBODIMENTS

Referring now to FIGS. 1–11, there can be seen the present invention, to wit, a swimming training system for the instruction of swimmers 10 while in a pool 12. The system comprises a means 14 for transmitting, a means 16 for receiving and a cap 18. Additionally, the system may comprise arms 20 and ear plugs 22 for channeling audible sound to the ears of the swimmer 10.

Figure 3:
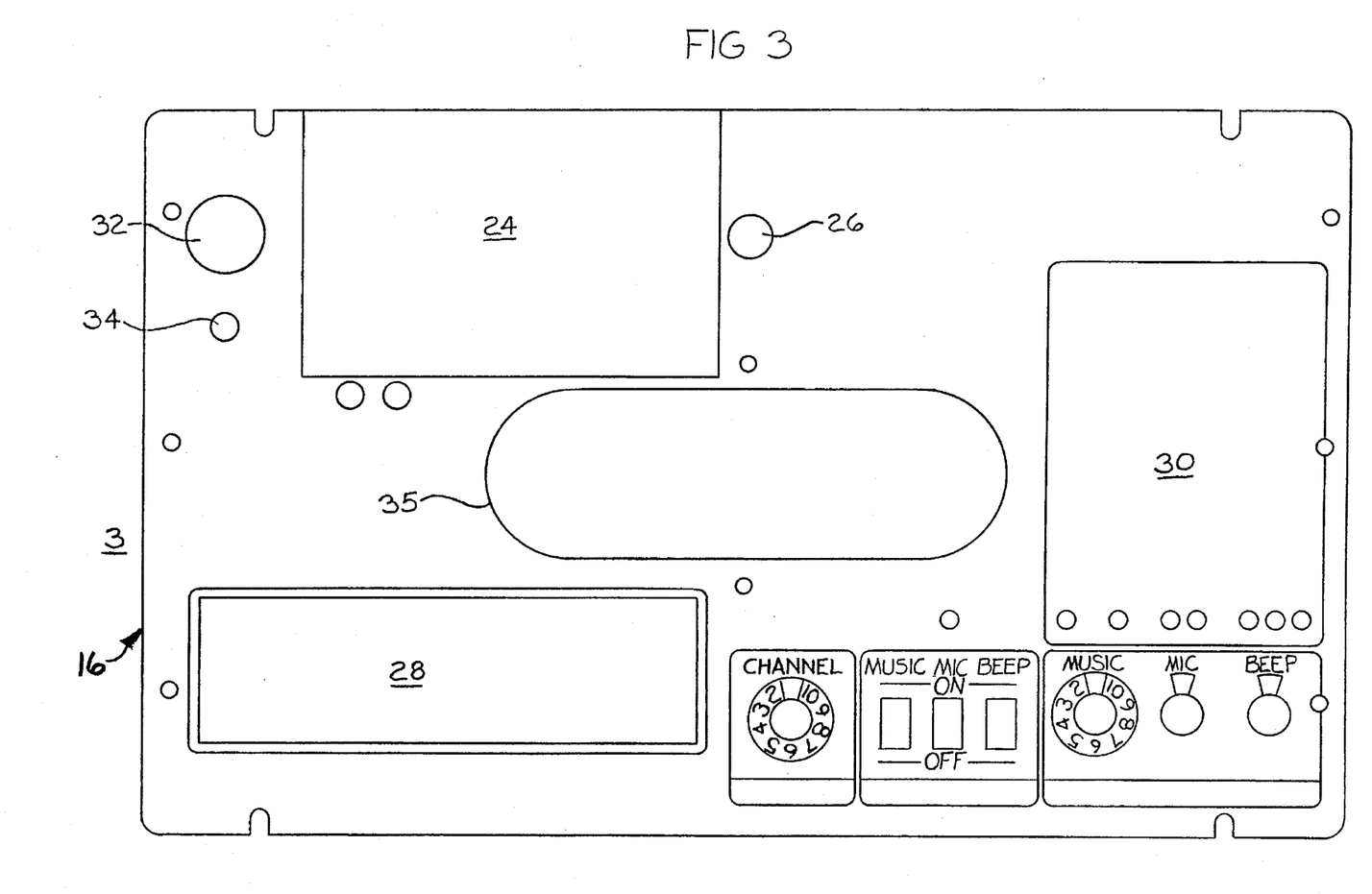
FIG. 3 is a top view of the transmitter unit of the present training system.

The means 14 for transmitting, as seen in a preferred embodiment in FIG. 3, comprises a transmitter 24 having an antenna 26 over which the electromagnetic waves generated by the transmitter 24 are generated. The transmitter 24 has the capability of broadcasting over a plurality of frequencies, such that a signal may patterned so that only certain receiving units may receive that broadcast. The transmitter 24 may be selected among those known and commercially available.

The means 14 for transmitting further comprises an AM/FM stereo cassette player 28, a timing mechanism or metronome 30 and a port 32 for receiving a microphone feed. The cassette player 28 has an antenna 34 associated therewith to receive radio signals for re-transmission to the swimmers 10. By insertion of a cassette of selected music or other material, a desired transmission can be effected. The cassette player 28 is envisioned as being replaceable by a compact disc player or other sound reproducing unit. The timing mechanism 30 allows the broadcast of a signal, such as a beep or chime, at regular intervals. This allows swimmers to gauge their efforts and thus evaluate in real time how their times will reflect their swimming. The incorporation of such a tinting device 30 into training systems, such as the present invention is, to the inventors' knowledge, heretofore unknown.

The port 32 allowing the connection of a microphone allows a coach or other instructor to broadcast to the swimmers 10. This ability to communicate directly with swimmers 10 during practice is invaluable and has not ken readily available to water athletes. Additionally, the combination of giving an athlete a timing signal 30 in combination with the verbal coaching instructions allows for critical instruction to perfect strokes or other techniques for optimal timing and performance. Such a combination of broadcasting or transmissions has not been heretofore achieved.

Although the envisioned primary use of the transmission means 14 is with competitive swimmers, it is seen that other water athletes, such as water polo players or water volleyball players, could benefit from the present training system. Additionally, public swimming pools are seen to be able to use the system to alert swimmers to closing time, emergency evacuation of the pool during violent weather, or simply to broadcast music for swimmers enjoyment.

Figure 1:
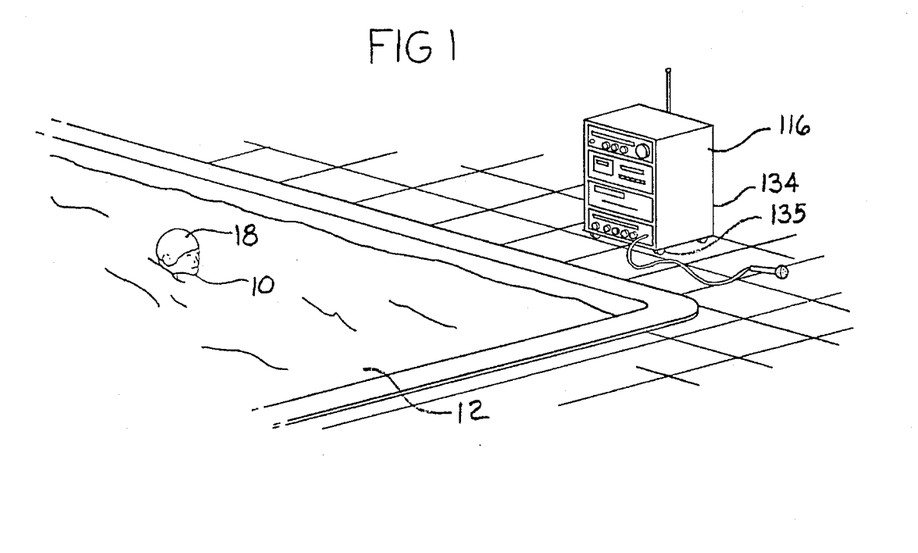
FIG. 1 is an environmental view of a swimmer wearing the present invention, with a transmitting unit at nearby poolside.
Figure 2:
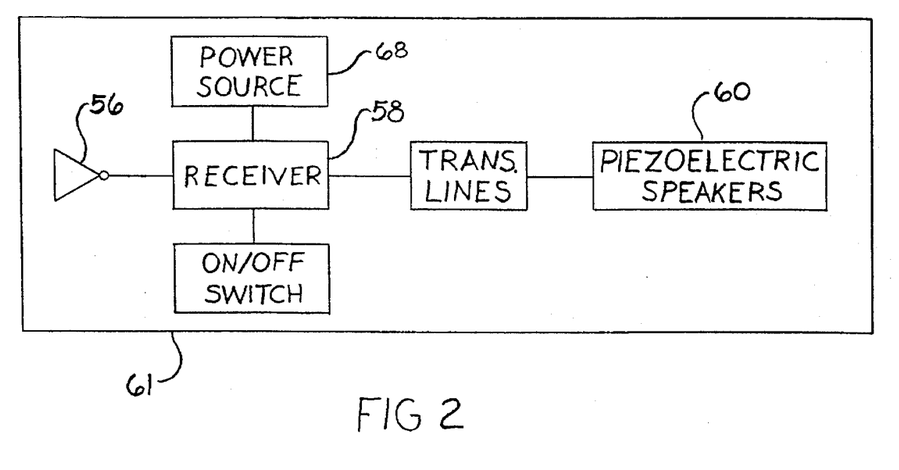
FIG. 2 is a schematic of the means for receiving the electromagnetic waves.

The means 14 for transmitting further comprises a case 35 having a handle 36 allowing easy carrying by the broadcaster. Alternately, as seen in FIG. 1, an encased unit 134 may have wheels 135 thereunder to allow movement of the unit 134.

Figure 4:
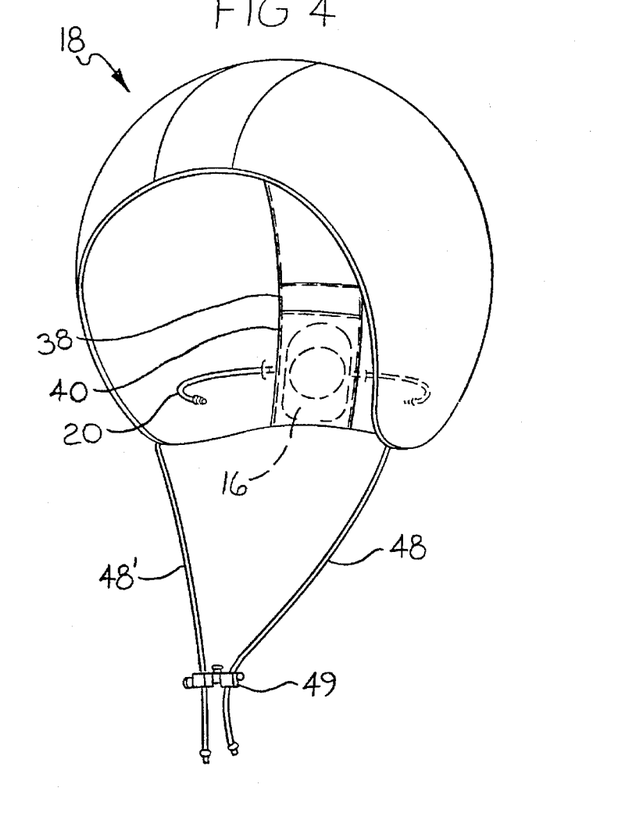
FIG. 4 is a perspective view of a preferred embodiment of a swimming cap of the present invention.
Figure 5:
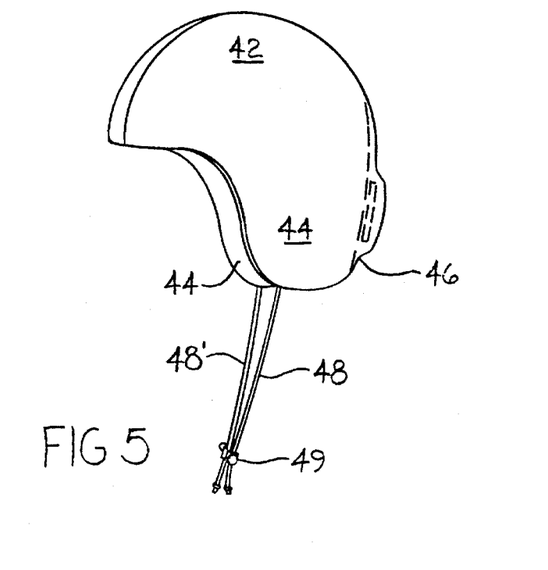
FIG. 5 is a side view of the preferred embodiment of the present invention.

Referring now to FIGS. 4–5, there is seen the receiving unit 16, comprising the means for receiving, deployed within the swimming cap 18. The receiving unit 16 is held within a sleeve 38 formed along the interior surface of the cap 18. Slits 40, 40' are positioned in the sleeves 38 such that the arms 20, 20' and attached ear pieces 22, 22' may be connected to the receiving unit while it is in the sleeve 38.

The cap 18 and the sleeve 38 are, in the preferred embodiment, formed of Lycra, a known waterproof and elastic material. Alternately, the cap 18 may be formed of rubber, vinyl or other suitable material. The cap 18 comprises a bowl portion 42, a pair of ear flaps 44, 44' integrally formed along the sides thereof, and a back portion 46 integrally formed between the ear flaps 44, 44' and rearwardly of the bowl portion 46. The sleeve 38 is deployed along the back portion 46 on the interior surface of the cap 18. A draw string 48, 48' is deployed integrally to each ear flap 44, 44'. A slide 49 having a spring catch formed therein receives each draw string 48, 48'. This allows the cap 18 to be tightened to meet the needs of the individual wearer. In a less preferred embodiment, it is envisioned that the draw strings 48, 48' could be intertwined in a knot to secure the cap 18.

Referring now to FIGS. 2 and 6–11, the means for receiving is seen to comprise the housing 50, having a lower base portion 52 and an upper domed portion 54, an antenna 56, a receiver 58 and at least one speaker 60. The housing 50 is formed of plastic, so that it is lightweight yet watertight. The base portion 52 has a flanged central area 62 where, preferably, a piezoelectric speaker 60 is deployed. A plurality of mounts 64 are formed therein, corresponding to mounts 64' formed in the upper portion 54. A rod 66 deployed above the speaker 60 keeps the receiver board, 61 having the antenna 56 and receiver 58 mounted thereon, from resting upon the speaker 60. A plate 69 is mounted above the board, such that a battery 68 is in connection therewith. The battery 68 supplies the power for the unit, and can be replaced by access from a threaded opening 70 on the domed upper portion 54, which opening 70 is closed by a cover 72.

Figure 7:
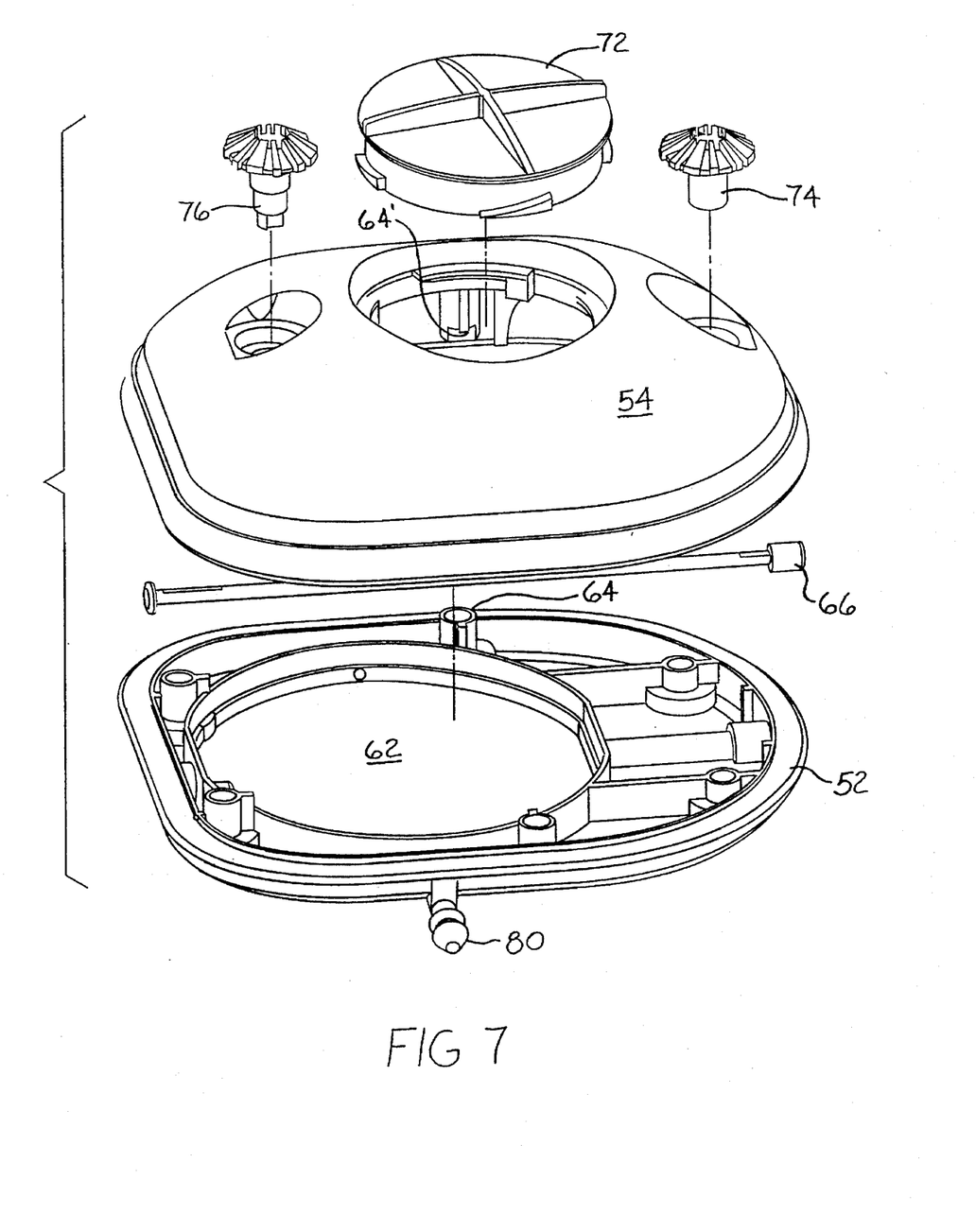
FIG. 7 is an exploded top view of the housing of the receiving unit of the preferred embodiment.
Figure 9:
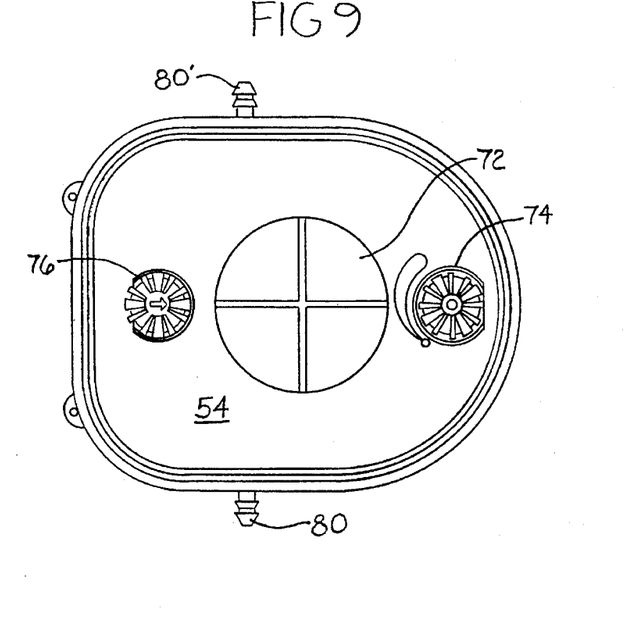
FIG. 9 is a top view of the housing of the receiving unit.
Figure 10:
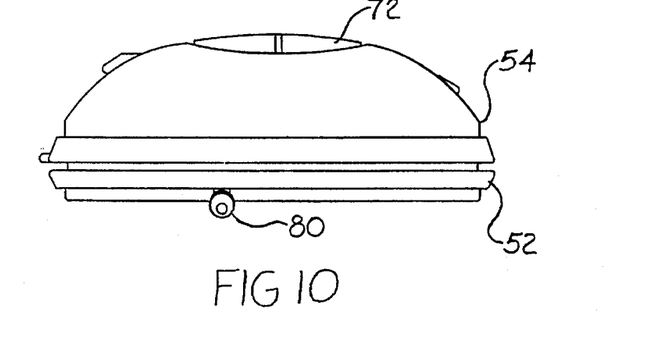
FIG. 10 is a side view of the housing of the receiving unit.
Figure 11:
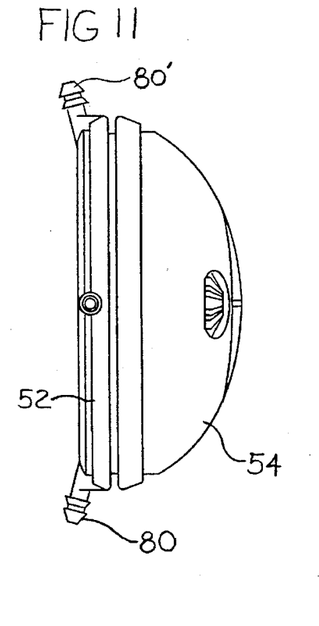
FIG. 11 is a rear view of the housing of the receiving unit.

Two control knobs 74, 76 are formed into the upper portion 54. The first knob 74 controls volume of the audible sound, while the second knob 76 controls which frequency the unit will receive. Each knob 74, 76 is in connection with the receiver board 61, such as is commonly known.

Figure 8:
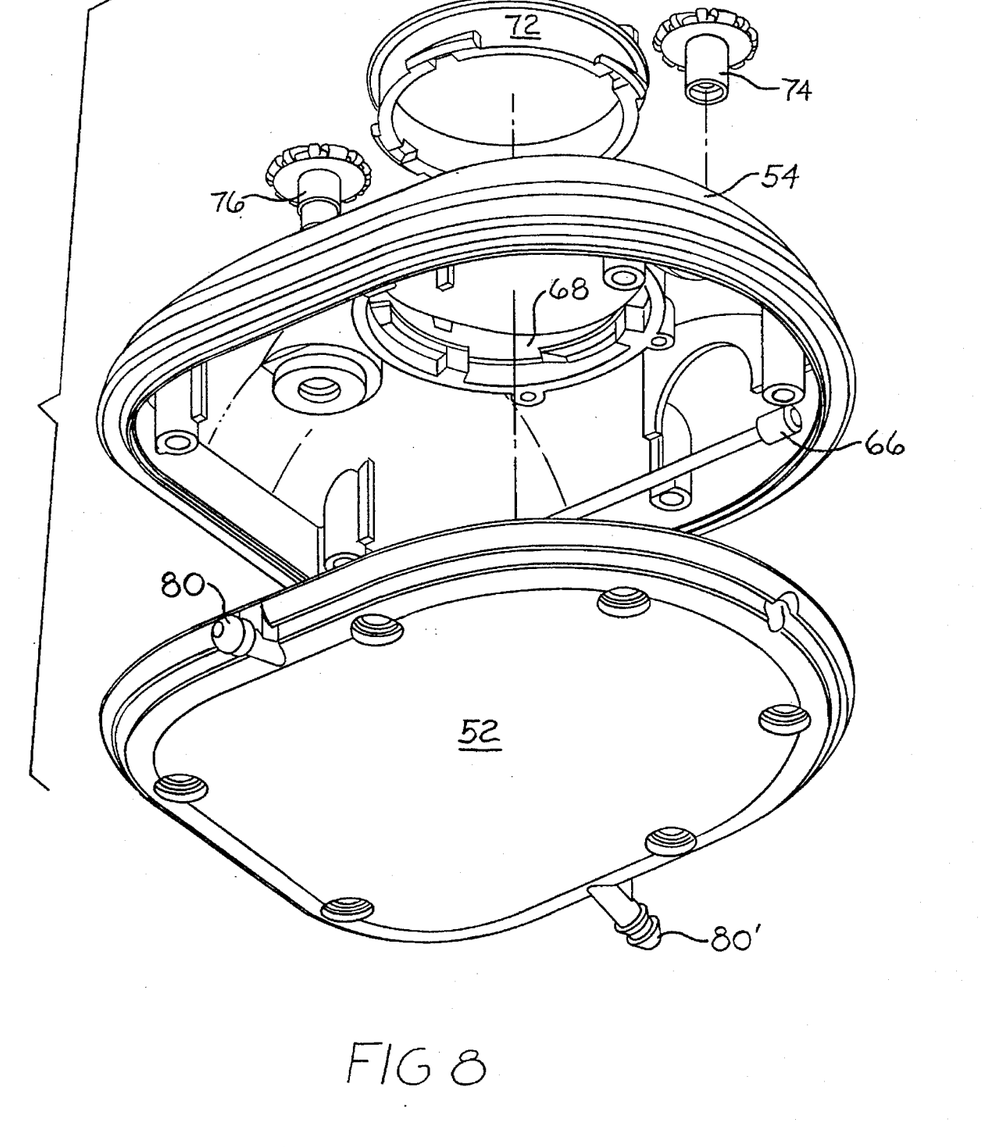
FIG. 8 is an exploded bottom view of the housing of the receiving unit of the preferred embodiment.

The lower portion 52 and the upper portion 54 are formed to interconnect to achieve a water-tight seal. The joining of the portions 52, 54 may be effected by sonic welding, fusion of the parts by melting with known solvents, or attachments with fasteners.

Figure 6:
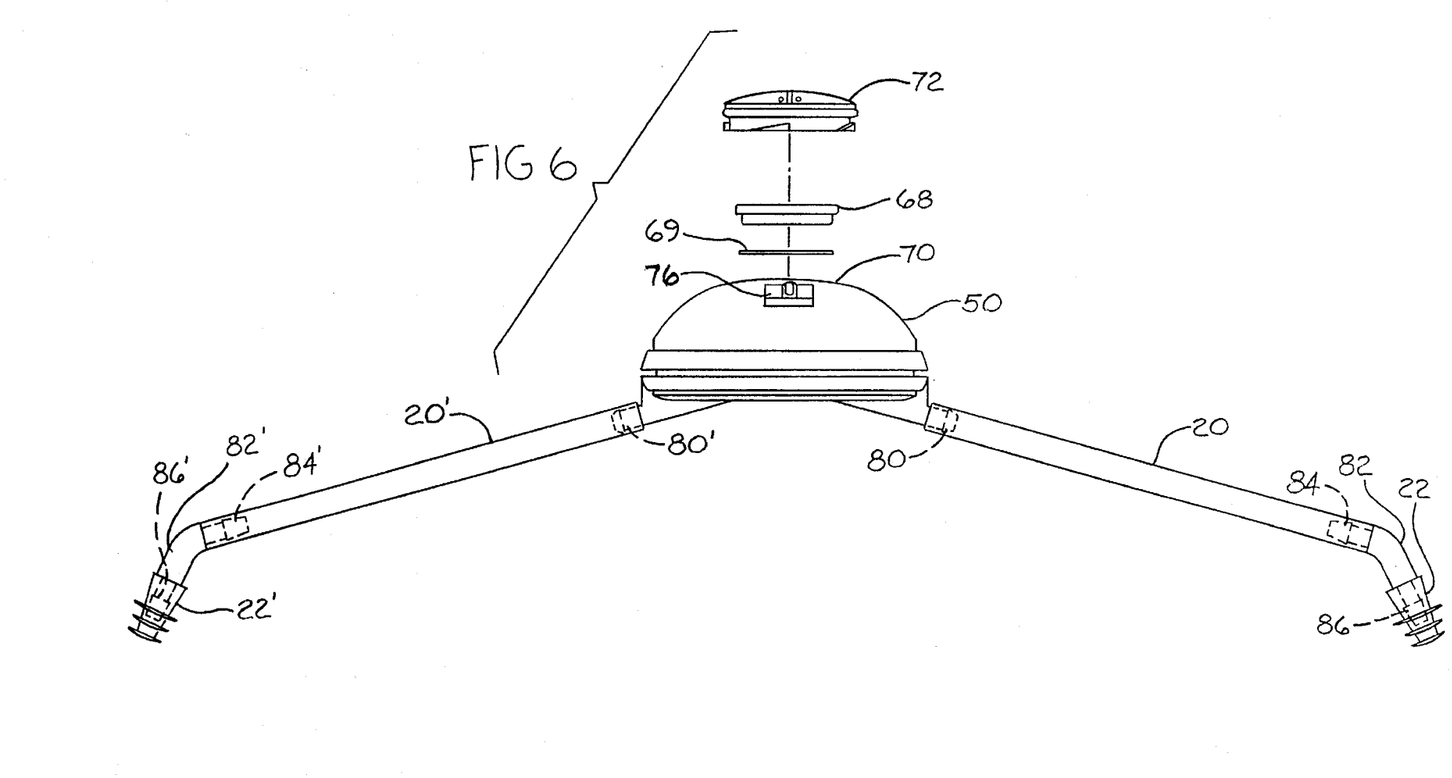
FIG. 6 is a forward end view of the receiving unit, arms and ear pieces of the present invention.

Two hose mounts 80, 80' are formed to the base portion 52. Each mount 80, 80' has a bore formed therein, such that the area in which the speaker 60 is located is accessible. One arm 20, 20' is mounted to each hose mount 80, 80'. Each arm 20, 20' is a flexible plastic tubular member. The arm 20, 20' fits over the mount, 80, 80' such that the bore of the mount 80, 80' is in communication with the interior of the arm 20, 20'. A connector 82, 82' is deployed at the opposite or second end of the arm 20, 20'. The connector 82 has a mounting 84 which fits into the interior of the arm 20, and the connector 82 itself has a hollow interior. A mount 86 at the opposite end of the connector 82 then fits into the ear piece 22.

The ear piece 22 is formed of a deformable plastic or foam. The ear piece 22 may be compacted, such as to make the area of the piece temporarily smaller. The piece 22 is then inserted into the ear of the swimmer. The piece 22 then expands, effecting a water-tight fit in the ear of the wearer.

It is seen that this construction effects a water-tight channel from the housing, through the arms and interconnecting mounts and connectors, to the ear piece and into the ear canal of the swimmer. This system of sound transporting achieves a high quality of sound and at a sufficient volume.

Figure 12:
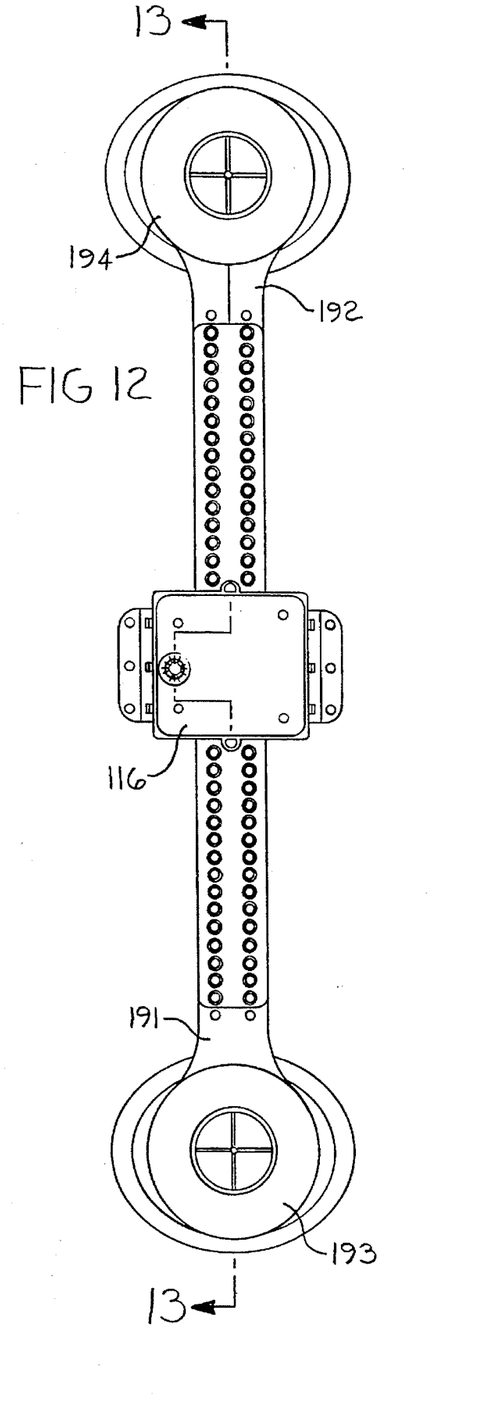
FIG. 12 is a top view of a second embodiment of the receiving unit of the present invention.
Figure 13:
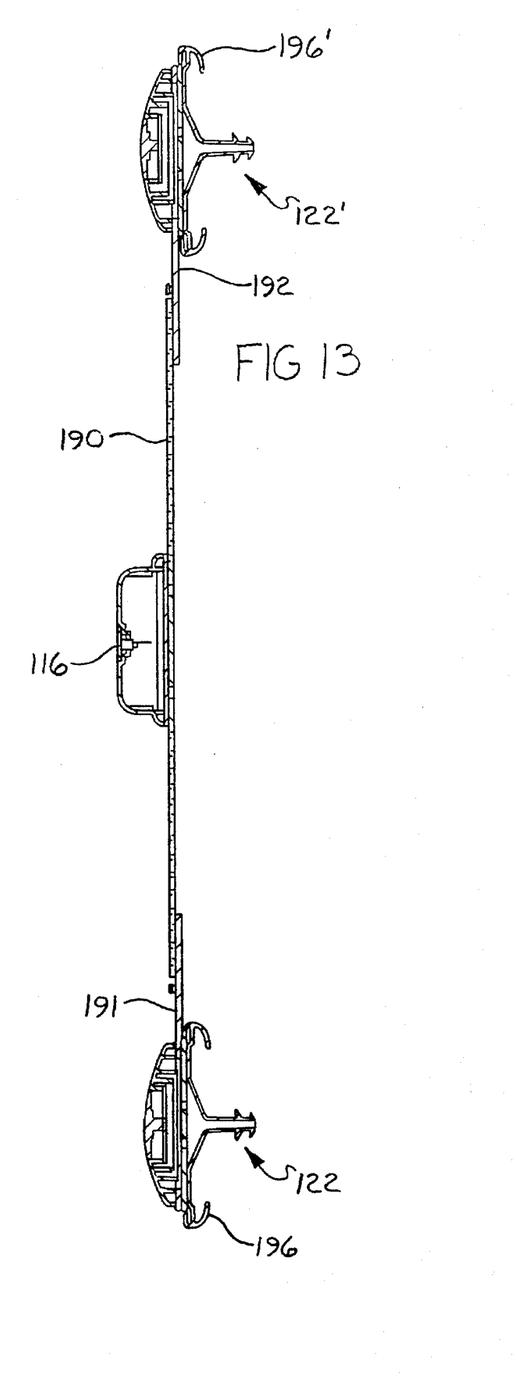
FIG. 13 is a cross-sectional side view of the second embodiment of the present invention.

Referring now to FIGS. 12 and 13, there is seen a second embodiment of the receiving unit. The receiving unit 116, itself, is substantially similar to that of the above-described preferred embodiment, save that the speaker is not contained therein. The receiving unit 116 is mounted upon a band 190 having adjustable end pieces 191, 192 thereof. The end pieces 191, 192 have piezoelectric speakers 193, 194 mounted thereon. Ear pieces 122, 122' are deployed thereabout the speakers, such that a direct channel can be made to the ear canal of the wearer. Alternately, the ear pieces may be deleted, leaving only the ear clips 196, 196' to help keep a connection with the ear of the wearer. This deletion is especially desired where the swimmer will be diving, as depths beyond 15 feet require that the ear plugs not be us In use, the present invention will, in the preferred embodiment, utilize the transmitting means in conjunction with at least one swimming cap having a receiving unit attuned to one of the frequencies being broadcast by the transmitting means. The swimmer, being in a pool., will have a cap with the ear plugs securely inserted. Thus, instructions, music and/or timing signals broadcast by the instructor can be heard. The unit has a capability of broadcasting up to 450 feet across the pool and up to a depth of six (6) feet.

The alternate embodiment having the ear plugs deleted with piezoelectric speakers deployed thereon is more suitable for deeper diving. A depth of up to 30 feet can be achieved by this system. It is noted that use of the ear plug at depths beyond about 15 feet could result in ear damage.

The electromagnetic waves are broadcast by the transmitting means. These waves are received by the antenna of the receiving unit, contained in the cap of the swimmer. The waves are converted by the receiver into electrical signals. The signals are passed to a speaker, which converts the signals to audible sound. The sound passes then through the arms connected thereto, through the ear pieces and into the ears of the swimmer.

Having, thus, described the invention, what is claimed is:

1. A swimming training system comprising:

(a) means for transmitting electromagnetic waves, the means for transmitting broadcasting signals over a plurality of frequencies, the means for transmitting comprising:
  (1) a transmitter;
  (2) a microphone in electrical connection with the transmitter for broadcasting instructions;
  (3) a metronome in electrical connection with the transmitter such that a timing signal is broadcast;

(b) a receiving unit capable of receiving the electromagnetic waves, the unit comprising:
  (1) an antenna to receive the waves;
  (2) a receiver in electrical connection with the antenna, the receiver converting the electromagnetic waves into electrical signals;
  (3) at least one speaker in electrical connection with the receiver, the at least one speaker converting the signals into audible sound;
  (4) a housing containing the antenna, receiver and at least one speaker therein;

(c) at least one arm connected to the housing;

(d) at least one ear plug connected to each arm, the arms and ear plugs serving as a conduit for the sound to pass from the receiving unit to the ears of a user; and (e) a swimming cap having a sleeve formed therein, the sleeve releasably retaining the receiving unit therein.

2. The system of claim 1, wherein the at least one ear plug is formed of a resilient, deformable material.

3. A swimming training system comprising:

(a) means for transmitting electromagnetic waves, the means for transmitting broadcasting signals over a plurality of frequencies, the means for transmitting comprising;
(1) a transmitter;
(2) a microphone in electrical connection with the transmitter for broadcasting instructions;

(b) a receiving unit capable of receiving the electromagnetic waves, the unit comprising:
(1) an antenna to receive the waves;
(2) a receiver in electrical connection with the antenna, the receiver converting the electromagnetic waves into electrical signals;
(3) at least one piezoelectric speaker in electrical connection with the receiver, the at least one piezoelectric speaker converting the signals into audible sound;
(4) a housing containing the antenna, receiver and at least one piezoelectric speaker therein;

(c) at least one arm connected to the housing;

(d) at least one ear plug connected to each arm, the arms and ear plugs serving as a conduit for the sound to pass from the receiving unit to the ears of a user; and (e) a swimming cap having a sleeve formed therein, the sleeve releasably retaining the receiving unit therein.

4. The system of claim 1, wherein the at least one ear plug is formed of a resilient, deformable material.

5. The swimming training device of claim 3 wherein the housing of the receiver unit further comprises:

(a) a substantially flat lower base portion and an upper domed portion, the upper portion being sealingly mounted onto the lower portion.

6. A swimming training device capable of receiving electromagnetic wave signals from a transmission source, the training device comprising:

(a) a housing having a lower base portion and an upper domed portion, the upper portion being sealingly mounted onto the lower portion;

(b) an antenna deployed within the housing to receive the electromagnetic waves;

(c) a receiver deployed within the housing and in connection with the antenna, the receiver converting the electromagnetic waves into an electrical signal;

(d) at least one speaker deployed within the housing, the speaker in connection with the receiver and converting the electrical signal into audible sound;

(e) means for conveying the audible sound from the unit to the ears of a listener;

(f) at least one tubular arm connected to the housing at one end thereof; and (g) at least one ear plug, the at least one ear plug being connected to the at least one tubular arm at a second end thereof.

* * * * *